Feb. 18, 1936.  L. D. BOYCE  2,030,849
WINDOW CONTROL DEVICE FOR AUTOMOBILES AND OTHER TRAVELING VEHICLES
Filed Feb. 5, 1934  5 Sheets-Sheet 1

LEONARD D. BOYCE
    *INVENTOR*

BY *George R. Ericson*
    *ATTORNEY*

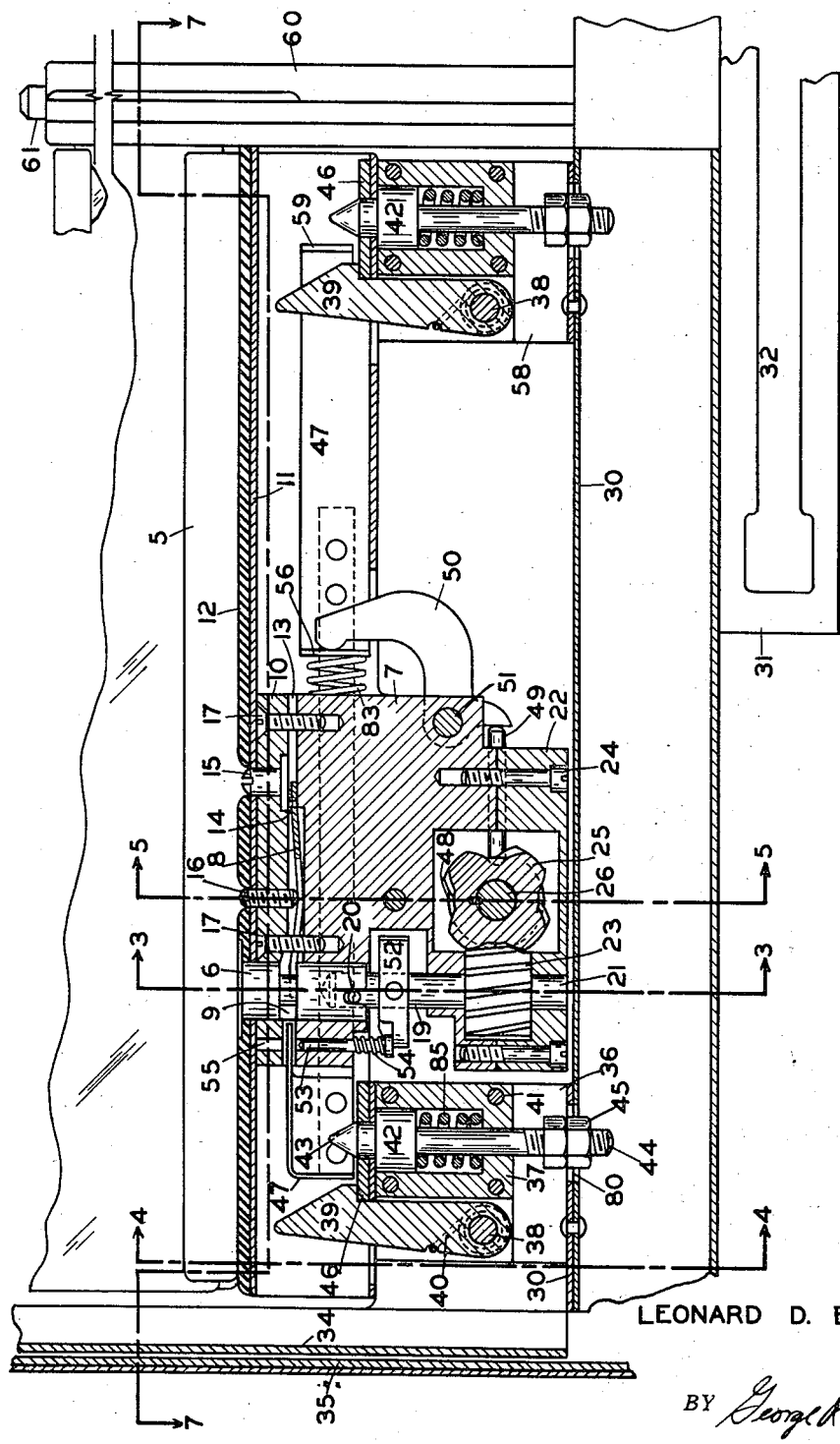

Feb. 18, 1936. L. D. BOYCE 2,030,849
WINDOW CONTROL DEVICE FOR AUTOMOBILES AND OTHER TRAVELING VEHICLES
Filed Feb. 5, 1934 5 Sheets-Sheet 3
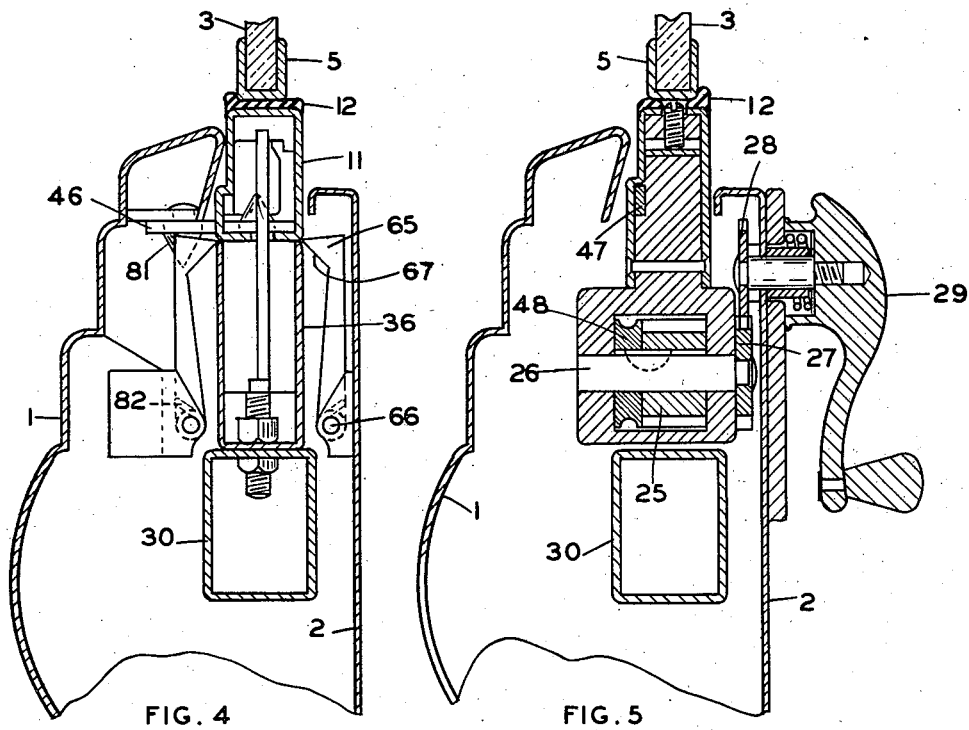
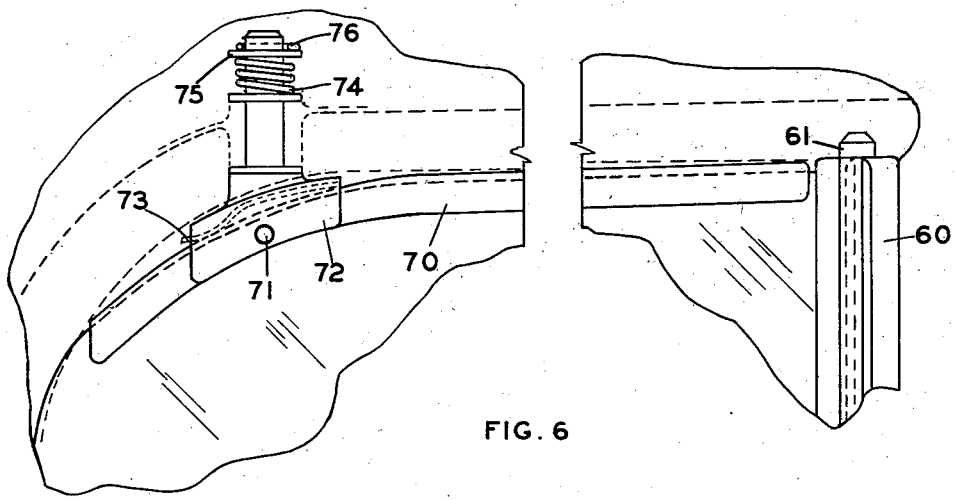
LEONARD D. BOYCE
*INVENTOR*
BY *George R. Ericson*
*ATTORNEY*

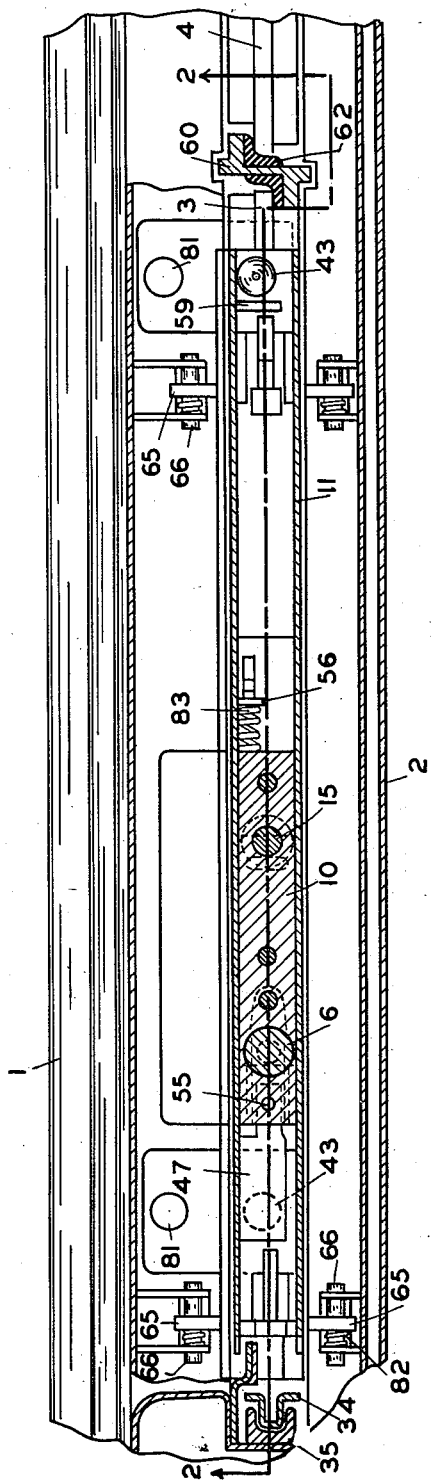

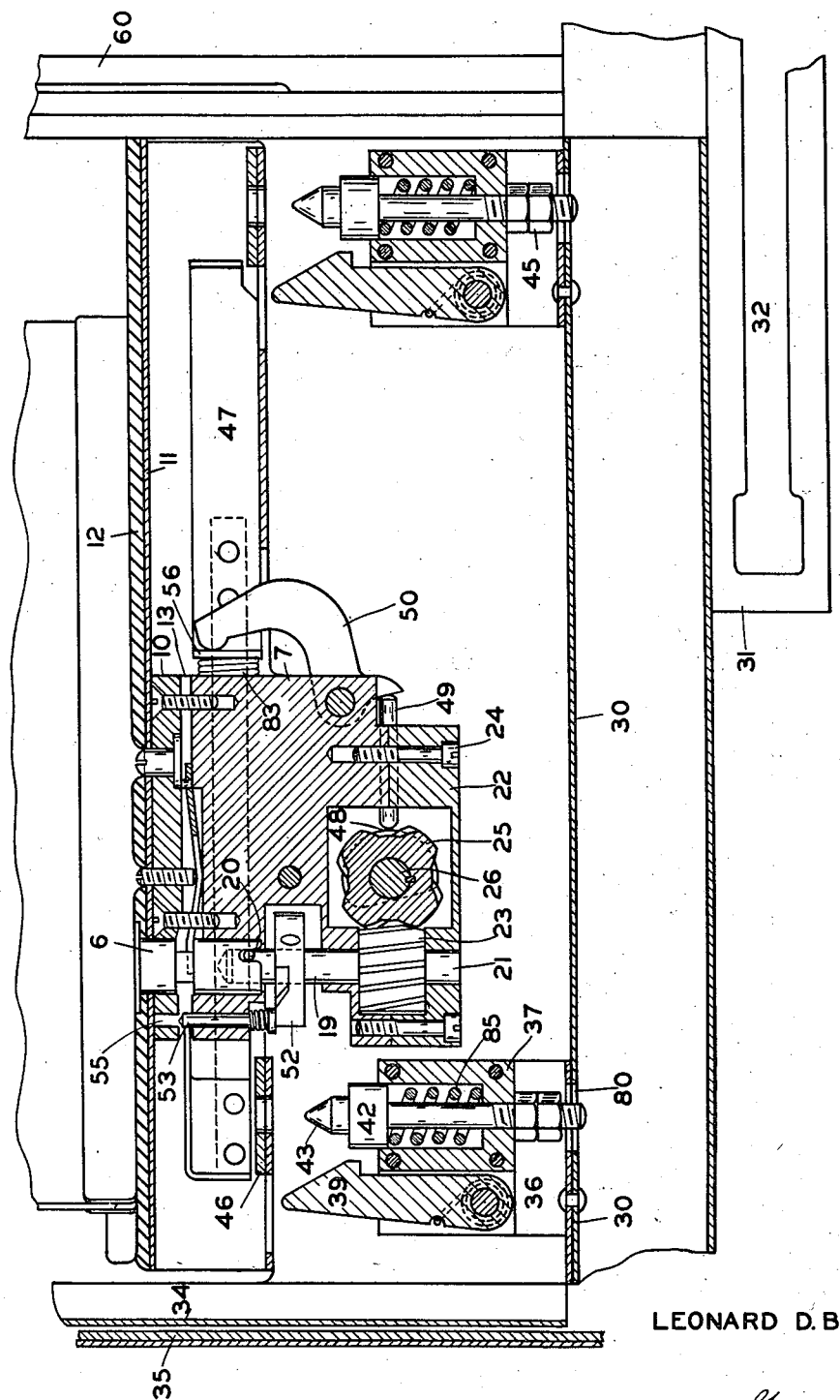

Patented Feb. 18, 1936

2,030,849

UNITED STATES PATENT OFFICE 2,030,849

WINDOW CONTROL DEVICE FOR AUTOMOBILES AND OTHER TRAVELING VEHICLES

Leonard D. Boyce, Maplewood, Mo.

Application February 5, 1934, Serial No. 709,779

1 Claim. (Cl. 296—44)

This invention relates to window control devices for automobiles and other traveling vehicles and more particularly to devices for pivoting, tilting and raising or lowering the window glass in such a manner as to give the operator complete control of the ventilation with the window in either open or closed position.

Previously known devices of this character have, in some cases, provided for the raising and lowering of the window glass and in other cases they have provided for the pivoting or tilting of the window glass to control the ventilation. I am not aware, however, that any device has been provided for permitting the tilting or pivoting of a window to control the ventilation in combination with means for lowering the tiltable portion of the glass so as to completely remove it from the window when the maximum open air conditions are desired.

An object of this invention is to provide a window having one or more panes of glass which may be tilted or pivoted to set up air currents of the desired character when the vehicle is moving, and having means for completely removing the glass and associated apparatus from the window opening when desired.

Other objects of the invention will appear from the following description and accompanying drawings, referring to which:

Figure 2 is an elevation, taken along the lines 2—2 of Figure 7, looking in the direction of the arrows and showing a part of the operating mechanism.

Figure 4 is a sectional elevation taken along the lines 4—4 of Figure 2, looking in the direction of the arrows and showing a part of the operating mechanism.

Figure 5 is a sectional elevation taken along the lines 5—5 of Figure 2, looking in the direction of the arrows and showing a part of the operating mechanism.

Figure 6 is an elevation of the upper portion of the window according to my invention, parts being broken away for better illustration of others.

Figure 7 is a sectional plan view taken along the lines 7—7 of Figure 2, looking in the direction of the arrows.

Figure 8 is a sectional elevation similar to Figure 2 except that the raising and lowering mechanism is shown in partially lowered position.

Figure 1:
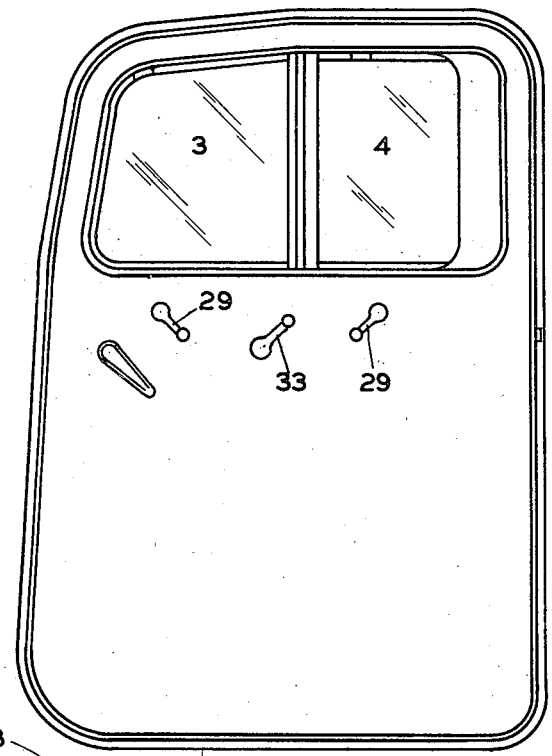
Figure 1 is an elevation showing the inside of an automobile door constructed according to my invention.
Figure 3:
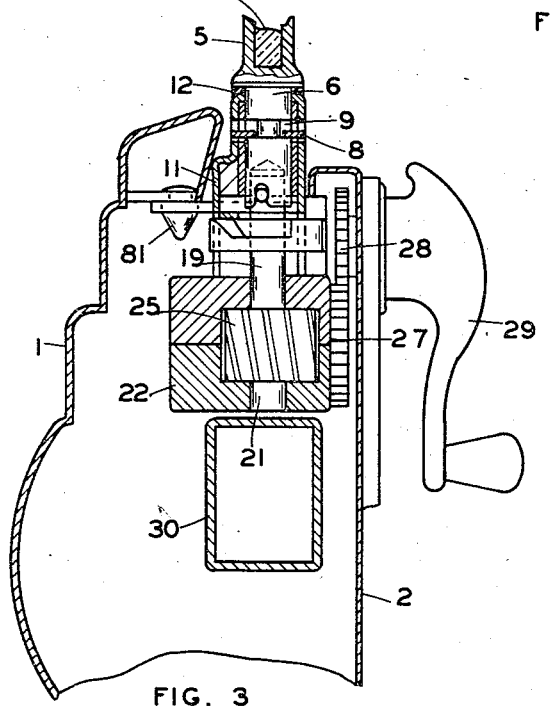
Figure 3 is a sectional elevation taken along the lines 3—3 of Figure 2, looking in the direction of the arrows and showing a part of the operating mechanism.

Referring to the drawings the reference numeral 1 indicates the outer panel of the door. This is of conventional form and is usually made of sheet metal with decorative molding around the window opening as indicated in Figures 1, 3, 4 and 5. The inner panel of the door is indicated by the reference numeral 2 and is also usually made of sheet metal. Both inner and outer panels are conventional except that openings are provided for certain operating handles hereinafter described. In the particular form of the invention shown herein, I have provided two separate window panes indicated by the reference numerals 3 and 4. The lower edges of these panes are supported in the channels 5 which are pivoted on the vertically extending pivot 6 which is rotatably mounted on the casting 7 which forms a part of the supporting frame. The pivot member 6 is provided with an annular recess 9 for the purpose of receiving the socket sheet metal retaining member 8. This retaining member is provided for the purpose of holding the pivot member 6 in assembled relation with respect to the casting 7, by permitting convenient removal of the pivot 6 and channel member 5 such as might be necessary in order to replace a broken pane.

A plate member 10 is interposed between the channel 5 and the casting 7 and the upper side of the supporting frame 11 is interposed between the plate 10 and the lower side of the channel 5. If desired a rubber pad or cushion 12 may be cemented to the supporting frame 11 for the exclusion of air which might otherwise flow thru the crack between the channel 5 and the supporting frame 11. The channel 13 is formed between the plate 10 and the casting 7 to permit sliding movement of socket retaining member 8. The right hand end of the member 8 is perforated to receive a small crank 14 which is eccentrically mounted on the rotatable member 15. The member 15 is provided at its upper end with a screw driver slot as indicated in Figures 2 and 8, so that by rotation thereof the member 8 can be withdrawn to permit the pivot 6 to be lifted out of its position in the casting 7, a set screw 16 is provided for preventing accidental withdrawal of the fork member 8 from the annular recess 9. The upper end of the set screw 16 is accessible when the channel member 5 is pivoted to one side or the other but is covered by the lower edge of the channel 5 when the same is in line with the supporting frame 11.

For the purpose of avoiding redundancy the supporting frame and operating mechanism for the front window frame 3 only will be described. It will be understood that a similar mechanism is provided for the rear window frame 4.

The plate 10 is rigidly attached to the casting 7 by means of suitable screws 17, one of which may, if desired, pass thru the fork or yoke and the member 8.

The lower end of the pivot member 6 is provided with a bore to receive the upper end of an operating shaft 19 and the lower end of the member 6 is also eccentrically slotted to receive the pin 20 which passes thru the shaft 19. The reason for locating the pin 20 eccentrically is to insure the parts being assembled in the same relative relation without requiring any special thought on the part of the operator. The lower part of the shaft 19 is provided with a bearing 21 in the casting 22 and a worm wheel 23 is rigidly mounted on the shaft 19. The casting 22 is attached to the casting 7 by means of screws or bolts 24. A worm gear 25 mounted on a transverse shaft 26 meshes with the worm wheel 23, the gear 25 may be either keyed to the shaft 26 as indicated in Figure 2 or else made a drive fit thereon. The end of the shaft 26 is provided with a sharp toothed spur gear 27 suitable for engagement with another sharp toothed gear 28 which is adapted to be operated by the operating handle 29. The reason for making the gears 27 and 28 with sharp teeth and of the spur type is to insure easy engagement of these two gears when the gear 27 is moved upwardly against the gear 28.

The previous description relates to the main part of the supporting frame or sub frame comprising the member 11 and associated parts. For the purpose of raising and lowering the supporting frame I have provided an elevating mechanism which will now be described. The main part of the elevating mechanism is the transverse member 30. This is a channel member of hollow rectangular cross section and is attached to an operating member 31 provided with a transverse slot 32. The construction of the operating member 29 is well known and it is only necessary to mention that the conventional operating handle or crank 33 operates an internal crank or lever which slides and rotates in the transverse slot 32 in the manner of a Scotch yoke, this being a conventional mechanism for raising or lowering the window guard. Any other suitable raising or lowering mechanism may be used for giving the member 30 an up and down movement. The transverse elevating member 30 is provided with a vertical channel member 34 which serves as a guide. It will be understood that this guide operates in a suitable channel 35 which is formed in the window frame. The elevating member 30 extends transversely clear across the window frame under the panes of glass 3 and 4 and is provided with vertical guides 34 at each end. It will be noted that the front edge of the pane 3 of the window is not vertical but the front guide 34 is not necessarily parallel with the edge of the window and is in a vertical position.

The lower ends of the guides 34 are bent inwardly to form the bracket or frame 36 which carries a casting 37, a transverse pivot 38, a dog or pawl 39 mounted on the pivot and a spring 40 for holding the dog in position. The pivot 38 is secured to the bracket 36 by any suitable means such as rivets or bolts 41. The inside of the member 37 is drilled from the upper end to receive a piston 42, the lower end of which is provided with a shaft 44 which extends thru the bottom of the casting 37 and is provided with lock nuts 45 to prevent unintentional disassembly. The elevating member is perforated as indicated at 80 so as not to interfere with the shaft 44 or the lock nut. The piston is normally held in upward position as shown in Figure 8 by the spring 85 but may be forcibly moved to the position shown in Figure 2 when the windows are fully raised.

The supporting frame is provided with a transverse member 46 which is perforated to receive the dowel 43 and the dowel 81, mounted rigidly on the door panel, for the purpose of maintaining alignment between the elevating device and the supporting frame when the window is lowered. The upper edge of the plate 46 is engaged by the dog or pawl 39 under certain conditions as indicated in Figure 2. The dog 39 may be disengaged from the plate 46 by means of the slidable unlatching member 47 whenever it is desired to lower the elevating mechanism without lowering the window pane. It will be understood that the desirability for being able to lower the elevating mechanism without lowering the window pane is to permit the lowering of the other window pane while leaving the first in elevated position.

The slidable unlatching member 47 is operated by means of a cam 48 which is rigidly mounted on the shaft 26. The cam 48 engages the slidable pin 49 which in turn engages the lever 50. This lever 50 is pivoted at 51 to the casting 7 and engages the slidable member 47 as indicated in Figure 2. It may be noted here that the member 25 is the worm and the member 23 is the gear so that member 25 rotates several times while the member 23 makes a half turn or less which is the limit of its movement. Due to the rapid movement of the cam 48 the member 50 will operate the slidable member 47 and disengage the dog 39 several times during a single half rotation of the window frame on its pivot 6. For this reason it is desirable to prevent the dog 39 from engaging the plate 46 whenever the window frame is within a few degrees of the position in which it is in line with the supporting frame and elevating mechanism. In other words it is desirable to provide some arrangement to prevent the possible lowering of the window pane when it is slightly out of alignment with the raising and lowering mechanism. In order to accomplish this I have provided a cam 52 having a comparatively steep contour and pinned to the shaft 19 as indicated in Figures 2 and 8. This cam operates a pin 53 normally held in lowered position by spring 54. The pin is slidably mounted in a vertical opening in the casting 7 and the plate 10 is also perforated at 55 to receive it.

It will be understood that a separate supporting frame is provided for each pane of glass used in the windows and similar dogs 39 engaging the plates 46 which are carried by the supporting frame are provided at each end of each supporting frame. The member 47 is also extended so as to simultaneously engage both dogs at the same time. It will be noted that the central portion of the slidable dog releasing member 47 is provided with an abutment or turned in portion 56 for engaging the end of the lever 50. No guide 34 is provided at the central part of the door so that a separate bracket member 58 attached to the elevating device 30 by any suitable means is provided for supporting the dog 39, the piston 42 and associated mechanism. The end of the slidable member 47 is turned over or hooked at 59 to engage the dog 39. Instead of providing vertical guides at the center of the window, I attach to the elevating device a vertical support member 60 having a dowel 61 at its upper end which enters a corresponding opening in the upper part of the window frame. Suitable rubber pads 62 are fitted to the vertical support 60 to prevent air leaks when the glass is in raised and closed position.

In order to hold the supporting frame in raised position when the elevating device is lowered and when it is not desired to lower the glass, a pair of dogs 65 are provided at the end of each supporting frame. The dogs are pivotally mounted to the door panels on pivots 66 and yieldably urged toward each other by spring means of conventional design as at 82. The purpose of these dogs is to slide under the supporting frame 11 whenever the top edge of the bracket 36 and 58 are separate from the supporting frame 11 sufficiently to permit the entry of the dog 65 into the crevice. When this occurs the supporting frame and the corresponding window pane are supported in upward position by the dog 65 and the elevating mechanism 30 and bracket 36 are raised high enough to encounter the tapered lower side 67 of the dog 65 so as to disengage them.

In order to hold the upper edge of the window pane firmly against wind resistance a channel shaped member 70 is provided. The member 70 is pivoted at 71 to a rotatable member 72 which is mounted on the upper edge of the window frame. A flat spring 73 is mounted on the upper edge of the window frame in such a manner as to move the left hand end of the member 70 downwardly with respect to Figure 6. Whenever the window pane is to be lowered it must first be moved to closed position, or, in other words, the position in which it is in alignment with the window frame. This brings the member 70 into alignment with the glass receiving groove in the window frame which is the space between the members 1 and 2 and as soon as the glass is lowered, the spring 73 causes the right hand end of the member 70 with respect to Figure 6 to enter the glass receiving space between the members 1 and 2. This serves as a convenient device for preventing the member 70 from wiggling around when the glass is lowered. A spring 74, held in place by the washer 75 and the cotter 76 is provided for the purpose of preventing rattling.

In operation the elevating device 30—31—32 is moved up and down by means of the operating handle 33 in the conventional manner. If either pane of glass is moved to fully closed position, that is, the position in which it is in alignment with the window frame, the dog 38 will engage the plate 46 when the elevated mechanism is in its upper position and the supporting frame and window pane will both be rigidly connected to the elevating device so that the window may be raised or lowered by means of the elevating mechanism. Whenever the elevating mechanism is in its upward position, the spring 83 will be compressed to the position shown in Figure 8, and the gear 27 will be enmeshed with the gear 28, then by means of the handle 29, each individual pane of glass may be rotated on the pivot 6. It will be understood that the pivot 6 is in alignment with the pivot member 72. The pane of glass being in its upward position the channel member 70 will be tilted in a clockwise direction with respect to Figure 6 so that the right hand end will be disengaged from the glass receiving crevice between the members 1 and 2, thereby permitting the glass to rotate about the pivot. With the first rotation of the crank 29, cam 48 will operate pin 49 and lever 50 to slide the member 47 to the left with respect to Figure 2, disengaging the boss 39. As soon as this is accomplished, the cam 52 will, upon further rotation slide the pin 53 upwardly to prevent the movement of member 47 to the right with respect to Figure 2 until the window pane is returned to its closed position. The open or pivoted window pane is now completely disengaged from the elevated mechanism. If one window is pivoted and the other left in closed position, the one which is closed may be raised or lowered while the one which is pivoted open, remains in upward position.

Assuming that one of the windows is tilted and the dog disengages in the plate 46, the first movement of the crank 33 in a direction to lower the elevating mechanism would permit the corresponding lowering of the supporting frame except for the spring 85. These have sufficient strength to hold up the weight of the window and supporting frame until approximately one quarter of an inch of downward movement of the elevating mechanism is accomplished. This is ample to permit the dog 65 to enter the increasing gap between the supporting frame 11 and the upper edges of the bracket 36 and the bracket 58. Upon continued downward movement of the elevating mechanism the piston 42 can no longer support the plate 46 and the supporting frame, but the supporting frames immediately come to rest upon the upper edges of the dog 65 and remain there until the elevating mechanism is lifted again sufficiently to first compress the spring 85 and finally to force the dog 65 back to the position shown in Figure 4.

I claim:

In a device of the class described, a pair of separated panels forming a door panel and a window frame therein, a pane of glass slidable between said panels and in said window frames, a supporting frame for the lower side of said pane of glass, said supporting frame having a pivot mounting therein upon which said pane of glass may be pivoted, another pivot mounted at the upper edge of said window frame and in axial alignment with said first named pivot, means carried by said upper pivot for engaging and supporting the upper edge of said pane of glass, said means comprising an inverted channel of sufficient width to freely receive the upper edge of the glass.

LEONARD D. BOYCE.